United States Patent [19]

Takasaki et al.

[11] 4,122,417

[45] Oct. 24, 1978

[54] VARIABLE EQUALIZER

[75] Inventors: Yoshitaka Takasaki, Tokorozawa; Kohei Ishizuka; Yasuhiro Kita, both of Hachioji; Yoshinori Nagoya, Yokohama; Takeo Kusama, Chigasaki, all of Japan

[73] Assignee: Hitachi, Ltd., Japan

[21] Appl. No.: 796,539

[22] Filed: May 13, 1977

[30] Foreign Application Priority Data

May 24, 1976 [JP] Japan ................................. 51-59122

[51] Int. Cl.$^2$ ............................................. H03H 7/14
[52] U.S. Cl. .................................. 333/28 R; 330/107; 330/304
[58] Field of Search ............. 333/28 R; 330/107, 109, 330/304

[56] References Cited

U.S. PATENT DOCUMENTS

| 3,456,206 | 7/1969 | Kwartiroff et al. ........... 333/28 R X |
| 4,027,259 | 5/1977 | Zellmer ............................. 333/28 R |

*Primary Examiner*—Paul L. Gensler
*Attorney, Agent, or Firm*—Craig & Antonelli

[57] ABSTRACT

To form a simple and economical variable equalizer, the equalizer is constructed of a differential amplifier having two input terminals to which an input signal to be equalized and an equalized output signal derived from the output terminal are applied, a first impedance circuit connected between the differential amplifier and the output terminal, and a series circuit having a second impedance circuit and a variable resistor connected in series between the output terminal and a ground terminal.

6 Claims, 5 Drawing Figures

VARIABLE EQUALIZER

BACKGROUND OF THE INVENTION

1. Field of the Invention

This invention relates in general to a variable equalizer, and more particularly, to a variable equalizer of the type which is used for compensation for the frequency characteristic variation in transmission lines in communication systems.

2. Description of the Prior Art

Although many kinds of variable equalizer circuits are well known in this field, there are few variable equalizers which are suitable for circuit integration and circuit simplification. The variable equalizer shown in FIG. 1, of which construction and operation will be described later, is one of conventional variable equalizers which are suitable for circuit integration.

The variable range over which the variable equalizer can operate effectively, is small since the variable equalizer is easily affected by the errors in circuit elements by the reason described later. Accordingly, in practical use, a plurality of variable equalizers have to be used in order to cover a wide compensation range. Therefore, it is important to construct variable equalizers as small and as economical as possible.

SUMMARY OF THE INVENTION

Accordingly, one object of this invention is to provide a simple structure for variable equalizers.

Another object of this invention is to provide a variable equalizer having a small number of circuit elements and without using inductors so as to economize on the circuit construction when a variable equalizer is used in combination of several sub-variable equalizers.

To achieve the above objects, a variable equalizer in accordance with this invention is constructed as follows:

An input signal to be equalized is added to a part of an output signal, namely, an equalized signal at an adder. The output signal of the adder is applied to an output terminal through a first series circuit including an amplifier and a first impedance circuit connected in series between the adder and an output terminal. Further, a circuit, including a second impedance circuit and variable resistor connected in series, is connected between the output terminal and a ground terminal.

The first and second impedance circuits have a predetermined frequency characteristic so that a proper equalization can be attained. In the variable equalizer described above, the adder and the amplifier may be realized using a single differential amplifier. Industorless networks having the same structure can be used for the first and second impedance circuits.

These and other objects and features of this invention will become apparent by the following description in conjunction with the accompanying drawings.

DESCRIPTION OF THE PREFERRED EMBODIMENTS

For the sake of better understanding of this invention, the principle and operation of a conventional variable equalizer will be explained in conjunction with FIG. 1 before the description of an exemplary embodiment in accordance with this invention is provided.

Figure 1:
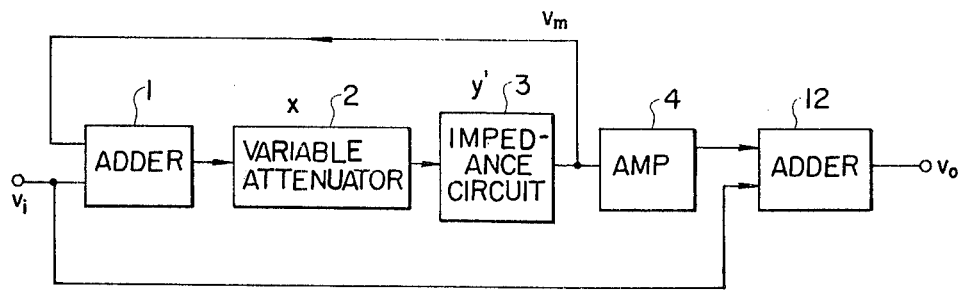
FIG. 1 is a schematic block diagram of a conventional variable equalizer.

Referring to FIG. 1, an input signal to be equalized, represented by $v_i$, is added to an intermediate signal, represented by $v_m$, in an adder 1. The output signal of the adder 1 is applied to an amplifier 4, which has a gain value of two, through a variable resistance circuit 2 and an auxiliary circuit 3.

Assuming that the output voltage of the auxiliary circuit 3, the transfer coefficient of the auxiliary circuit 3 and the variable attenuator 2 are represented by $v_m y'$ and $x$, respectively, the following relationship (1) is obtained.

$$v_m = (xy'/1 - xy') v_i \quad (1)$$

Therefore, the output voltage $v_O$ of the equalizer is represented by the following equation:

$$v_O = 2v_m + v_i = \frac{1 + xy'}{1 - xy'} v_i \quad (2)$$

By replacing $y = (1/y')$, equation (2) is rewritten as $$v_O = (y + x)/(y - x) v_i \quad (3)$$

This equation is well known in this field as a function representing a characteristic of a variable equalizer (see, F. Brgletz "Inductorless Variable Equalizer", IEEE Trans. CAS, Vol. CAS022, p. 415–418. May, 1975).

However, in this type of a variable equalizer, as apparent from the equation (3), when the value of $x$ is almost equal to that of $y$, that is, the denominator in formula (3) approaches 0, the characteristic of the variable equalizer becomes extremely sensitive to the error of the individual circuit elements of which it is made up. Therefore, in practical use, it is very rare to use a one stage variable eqalizer of the type shown in FIG. 1. Rather, a variable equalizer is generally constructed by combination of a plurality of elemental variable equalizers each of which has a small variable. Therefore, it is very important to construct the respective subvariable equalizers using a small number of circuit elements so as to realize a small and economical variable equalizer.

Figure 2:
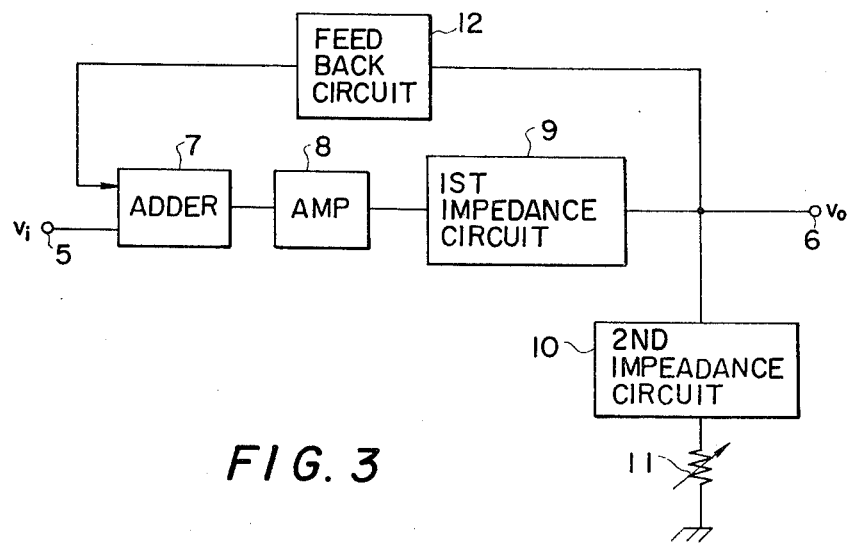
FIG. 2 is a block diagram of a variable equalizer in accordance with this invention.

As shown in FIG. 2, which shows a block diagram of the essential construction of a variable equalizer according to this invention, there is provided an adder 7, an amplifier 8, and a first impedance circuit 9, each of which is connected in series between input terminal 5 and output terminal 6. A feedback circuit 12 is connected between the adder 7 and the output terminal 6, and a second impedance circuit 10 and a variable resistor 11 are connected in series between the output terminal and ground.

As described in a following embodiment, in practical use, the combination of the adder 7, the amplifier 8, and the feedback circuit 12 is formed by a differential amplifier. Further, first and second impedance circuits 9 and 10 have predetermined frequency characteristics.

An input signal $v_i$ to be equalized is supplied to adder 7 from input terminal 5. In the adder 7, the input signal is added to the output signal of the feedback circuit 12, which has a constant gain independent of frequency. The output signal of the adder 7 is applied to the output terminal 6 through the amplifier 8 and the first impedance circuit 9. The output of the first impedance circuit 9 is also applied back to the input of the adder 7 through feedback circuit 12 and the other part of the output signal of the first impedance circuit is grounded through the second impedance circuit 10 and variable resistor 11.

Assuming that the transfer coefficient of the feedback circuit is represented by $a$, the impedances of the first impedance circuit 9, the second impedance circuit 10 and the resistor 11 are represented by $y_1$, $y_2$ and $x'$ respectively, and the gain of the amplifier 8 is represented as G, the relationship between the voltage $v_i$ of the input signal and the voltage $v_O$ of the output signal of the equalizer is represented by the following equation:

$$v_O = G \frac{x' + y_2}{(1 - aG)x' + y_1 + y_2 - aGy_2} v_i$$

When the following relationships are obtained:

$$b = aG - 1 > 0, \quad x = x' - z$$

$$y = y_2 + z = \frac{y_1 + y_2 - aGy_2}{b} - z$$

where $z$ is the reference value of $x'$, the equation (4) can be rewritten as follows:

$$v_O = \frac{G}{b} \frac{x + y}{-x + y} v_i \qquad (5)$$

This means that the variable equalizer shown in FIG. 2 realizes a frequency characteristic suitable for variable equalization.

Figure 3:
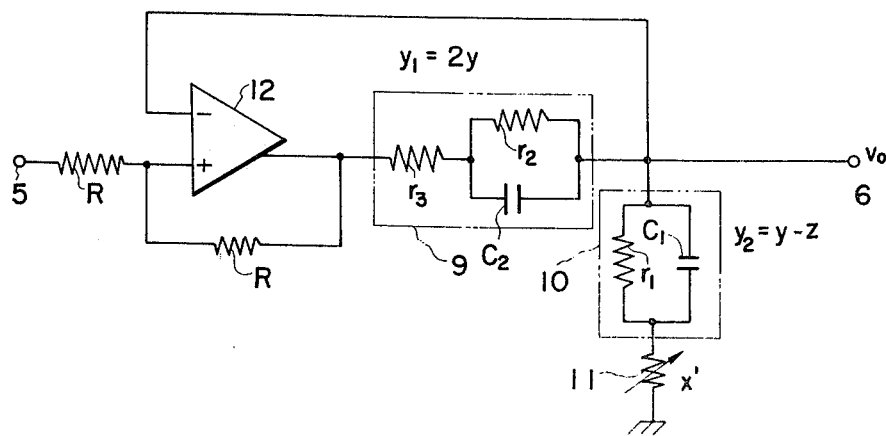
FIG. 3 is a circuit diagram representing one embodiment of a variable equalizer in accordance with this invention.

One embodiment of a variable equalizer in accordance with this invention is shown in FIG. 3. In this embodiment, the gains of the feedback circuit 12 and the amplifier 8 is $a = -1$ and $G = -2$, respectively. The practical circuit combination of the adder 7 and the amplifier 8 in FIG. 2 is constructed of a differential amplifier 12 as shown in FIG. 3. First impedance circuit 9 is formed by resistors $r_3$ and $r_2$ and a capacitor $c_2$, and the second impedance circuit 10 is formed of a resistor $r_1$ and a capacitor $c_1$ connected in parallel.

Figure 4:
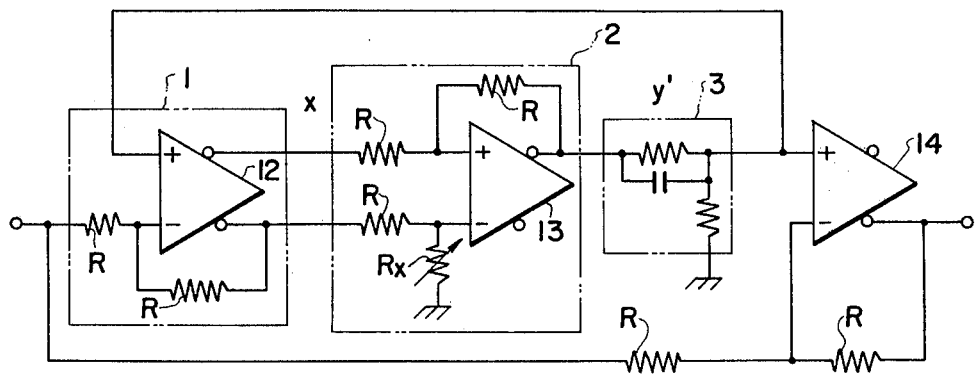
FIG. 4 is a circuit diagram of a conventional variable equalizer having the same characteristic as that of the variable equalizer shown in FIG. 3.
Figure 5:
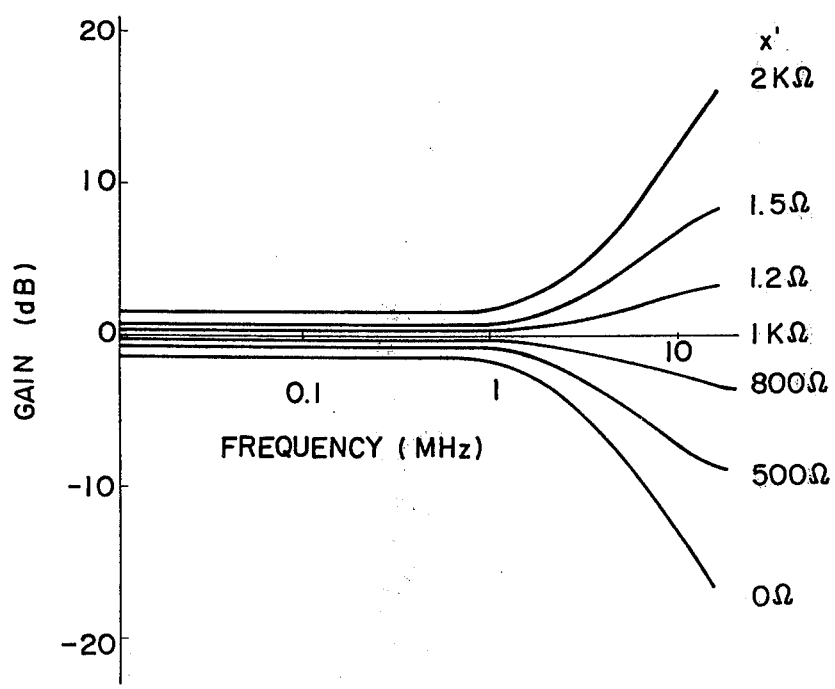
FIG. 5 is a characteristic diagram of a frequency characteristic of the variable equalizer according to this invention.

The frequency characteristic of the elemental variable equalizer is shown in FIG. 5 when the resistance of the variable resistor 11 is variable over the range 0 $-2K\Omega$, and the impedances of circuit elements in the first and second impedance circuit is established as follows:

$r_1 = 10K\Omega, r_2 = 2r_1, c_1 = 31.8 \, pF \, c_2 = c_1/2 \, z = 1K$ and $r_3 = 2z$ FIG. 4 shows a circuit diagram of a conventional variable equalizer constructed in accordance with FIG. 1 using as few circuit elements as possible. In the practical circuit arrangement in FIG. 1, a buffer amplifier must be interposed between the variable coefficient circuit 2 and auxiliary circuit 3 as shown in FIG. 4 which necessitates a plurality of active elements, that is, differential amplifier 12, 13, and 14. Further, the cirucit of FIG. 4 necessitates a greater number of circuit elements, such as resistors R, than those of the circuit shown in FIG. 3. Accordingly, the power consumption and manufacturing cost of a variable equalizer in accordance with this invention are extremely reduced in comparison with those of the conventional variable equalizer shown in FIG. 4.

Further, other conventional variable equalizers necessitate capacitors with a large capacity for A.C. coupling circuit elements since it is difficult to effect coincidence of the DC voltage level between circuit elements. Accordingly, the conventional circuit is not readily suitable for manufacture using integrated circuit techniques. On the other hand, the variable equalizer according to this invention is quite simple, as shown in FIG. 3, and it is possible to use DC coupling and integrated circuit techniques with this circuit.

While we have shown and described one embodiment in accordance with the present invention, it is understood that the same is not limited thereto but is susceptible of numerous changes and modifications as known to a person skilled in the art, and we, therefore, do not wish to be limited to the details shown and described herein but intend to cover all such changes and modifications as are obvious to those of ordinary skill in the art.

What is claimed is:

1. A variable equalizer which cmprises
   (a) an input terminal of the equalizer to which an input signal to be equalized is applied;
   (b) an output terminal of the equalizer from which an equalized output signal is derived;
   (c) an adder circuit having first and second input terminals, the first input terminal being connected to said input terminal of the equalizer;
   (d) an amplifier to which the output signal of said adder is applied;
   (e) a first impedance circuit through which the output signal of said amplifier is applied to said output terminal of the equalizer, said first impedance circuit having a predetermined frequency characteristic;
   (f) a series circuit connected between said output terminal and ground including a second impedance circuit and a variable resistor connected in series, said second impedance circuit having a predetermined frequency characteristic; and
   (g) a feedback circuit connected between said second input terminal of the adder and said output terminal of the equalizer, and having feedback coefficient that is independent of frequency.

2. A variable equalizer according to claim 1, wherein the combination of said adder, said amplifier, and said feedback circuit is provided in the form of a differential amplifier.

3. A variable equalizer according to claim 1, wherein said first and second impedance circuits are passive circuits formed by resistors and capacitors.

4. A variable equalizer according to claim 1, wherein the coefficient $a$ of said feedback circuit, the gain G of said amplifier, the impedance $y_1$ of the first impedance circuit, the impedance $y_2$ of the second impedance circuit, and the reference value $z$ of the resistance $x'$ of said variable resistor have the following relationship:

$$aG - 1 > 0,$$

$$y_2 + z = \frac{y_1 + y_2 - aGy_2}{aG - 1} z.$$

5. A variable equalizer according to claim 1 wherein said first impedance circuit comprises a first resistor and a first capacitor connected in parallel, the parallel circuit of said first resistor and said first capacitor being connected in series with a second resistor.

6. A variable equalizer according to claim 5 wherein said second impedance circuit comprises a third resistor connected in parallel with a second capacitor.

* * * * *